(12) United States Patent
Seiberle et al.

(10) Patent No.: US 8,906,458 B2
(45) Date of Patent: Dec. 9, 2014

(54) TOPOLOGICALLY STRUCTURED POLYMER COATING

(75) Inventors: Hubert Seiberle, Weil am Rhein (DE);
Martin Schadt, Seltisberg (CH);
Mohammed Ibn-Elhaj, Allschwil (CH);
Carsten Benecke, Weil am Rhein (DE);
Klaus Schmitt, Lörrach (DE)

(73) Assignee: Rolic AG, Zug (CH)

( * ) Notice: Subject to any disclaimer, the term of this patent is extended or adjusted under 35 U.S.C. 154(b) by 625 days.

(21) Appl. No.: 12/357,318

(22) Filed: Jan. 21, 2009

(65) Prior Publication Data
US 2009/0136687 A1 May 28, 2009

Related U.S. Application Data

(63) Continuation of application No. 11/515,736, filed on Sep. 6, 2006, now abandoned, which is a continuation of application No. 10/110,994, filed as application No. PCT/CH00/00562 on Oct. 18, 2000, now abandoned.

(30) Foreign Application Priority Data

Oct. 19, 1999 (GB) .................................... 9924746.2
Oct. 27, 1999 (GB) .................................... 9925458.3

(51) Int. Cl.
*B05D 3/00* (2006.01)
*B82Y 30/00* (2011.01)
*G02F 1/1337* (2006.01)
*B29C 41/00* (2006.01)
*G02B 5/30* (2006.01)
*G02B 5/18* (2006.01)
*C09K 19/54* (2006.01)
*G02F 1/139* (2006.01)

(52) U.S. Cl.
CPC ............. *G02F 1/13378* (2013.01); *B82Y 30/00* (2013.01); *G02F 1/1391* (2013.01); *B29K 2995/0072* (2013.01); *B29C 41/003* (2013.01); *G02B 5/3083* (2013.01); *G02B 5/1847* (2013.01); *C09K 19/542* (2013.01)
USPC ............................. 427/271; 427/487; 427/508

(58) Field of Classification Search
USPC .......................................... 427/487, 271, 508
See application file for complete search history.

(56) References Cited

U.S. PATENT DOCUMENTS 4,029,392 A 6/1977 Moriyama et al.
5,430,563 A 7/1995 Bouteiller et al.
(Continued)

FOREIGN PATENT DOCUMENTS

EP 0 216 622 A2 4/1987
EP 0 612 827 A1 8/1994
(Continued)

OTHER PUBLICATIONS

Mohammed Ibn-Elhaj and Martin Schadt, "Optical Polymer Thin Films With Isotropic and Anisotropic Nano-Corrugated Surface Topologies," Nature, vol. 410, pp. 796-799, Apr. 12, 2001.
(Continued)

*Primary Examiner* — Robert S Walters, Jr.
(74) *Attorney, Agent, or Firm* — Sughrue Mion, PLLC

(57) ABSTRACT

Sub-micron-structured (nanostructured) polymer film or coatings are made by coating a substrate with a mixture of materials. One of the materials is removed using a selective solvent, leaving pores or other nanostructure. The substrate may be grooved, providing a competing nanostructure. The coating may act as an antireflective coating, optical retarder, optical diffuser, or orientation layer.

15 Claims, 8 Drawing Sheets

(56) References Cited

U.S. PATENT DOCUMENTS

Figure 1:
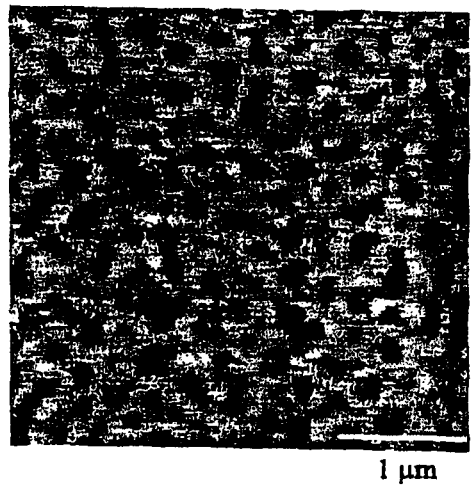
Figure 1:
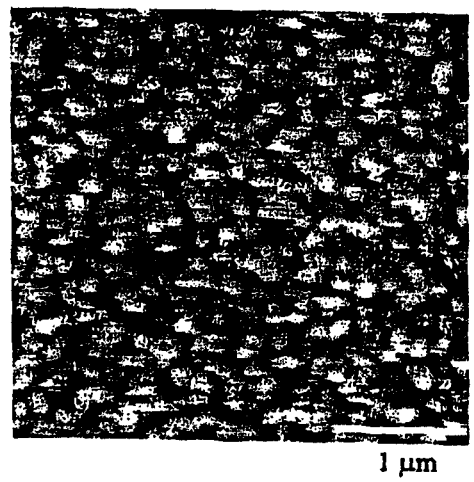
Figure 1:
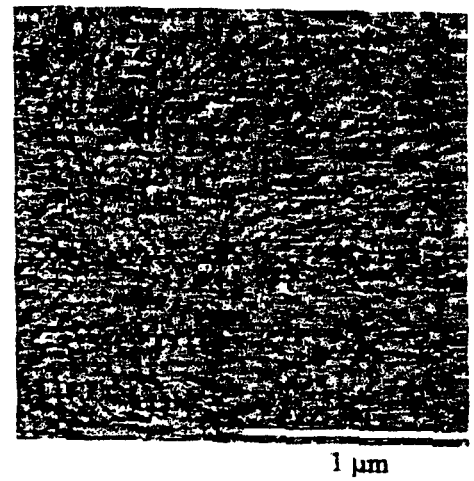

| | | |
|---|---|---|
| 5,498,450 A | 3/1996 | Akashi et al. |
| 5,605,727 A | 2/1997 | Bouteiller |
| 5,724,113 A | 3/1998 | Bryan-Brown et al. |
| 5,847,795 A | 12/1998 | Satoh et al. |
| 6,061,113 A | 5/2000 | Kawata |
| 6,093,344 A | 7/2000 | Park et al. |
| 6,285,427 B1 | 9/2001 | Lee et al. |

FOREIGN PATENT DOCUMENTS

| | | | |
|---|---|---|---|
| EP | 0 688 851 A1 | 12/1995 | |
| JP | 1-131257 A | 5/1989 | |
| JP | 04121701 A | 4/1992 | |
| JP | 06003501 A | 1/1994 | |
| JP | 09171172 A | 6/1997 | |
| JP | 10282305 A | 10/1998 | |
| JP | 10333133 A | 12/1998 | |
| JP | 11-95195 A | 4/1999 | |
| WO | 98/39673 A1 | 9/1998 | |
| WO | WO 9852077 A1 * | 11/1998 | G02B 5/30 |

OTHER PUBLICATIONS

Schadt et al., "Photo-Induced Alignment and Patterning of Hybrid Liquid Crystalline Polymer Films on Single Substrates", Jpn. J. Appl. Phyus., vol. 34, pp. L764-L767 (1995).

Schadt et al., "Photo-Generation of Linearly Polymerized Liquid Crystal Aligning Layers Comprising Novel, Integrated Optically Patterned Retarders and Color Filters", Jpn. J. Appl. Phys., vol. 34, pp. 3240-3249 (1995).

Fuh et al., "Polymer Network Formed in Liquid Crystals: Polymer-Network-Induced Birefringence in Liquid Crystals", Jpn. J. Appl. Phys., vol. 35, pp. 3960-3963 (1996).

Walheim et al., "Nanophase-Separated Polymer Films as High-Performance Antireflection Coatings", Science, vol. 283, pp. 520-522 (1999).

Abstracted-Pub-No. JP 100207753A, Patent-Assignee: Dainippon Printing Co. Ltd.[NIPQ], Jan. 1998.

Abstract; Pat-No. JP406289374A, Optical Element and Its Production, Oct. 18, 1994; Assignee: F Hoffmann La Roche AG.

Abstract; Pat-No. JP407248487A, Liquid Crystal Optical Element; Sep. 26, 1995, Assignee: Dainippon Printing Co. Ltd.

* cited by examiner a)

b)

c)

a)

b)

a)

1 µm b)

c)

a)

b)

a)

b)

$\alpha \cong -15°$
$\theta i = \theta j \cong 15°; \theta k = 0°$ $\alpha \cong -15°$
$\theta i = \theta j \cong 40°; \theta k = 0°$ a)

$\alpha \cong 15°$
$\theta i = \theta j = \theta k = 0°$ $\alpha \cong 15°$
$\theta i = \theta j = -90°; \theta k = 0°$ $\alpha \cong 15°$
$\theta i \cong 20°, \theta j = 0°; \theta k \cong 20°$ $\alpha \cong -15°$
$\theta i = \theta j = \theta k = 0$ $\alpha \cong 15°$
$\theta i = \theta j = -45°; \theta k = 0°$ $\alpha \cong 15°$
$\theta i \cong -45°, \theta j = -45°; \theta k \cong 40°$ b)

TOPOLOGICALLY STRUCTURED POLYMER COATING

CROSS REFERENCE TO RELATED APPLICATIONS

This is a continuation of application Ser. No. 11/515,736 filed Sep. 6, 2006 now abandoned, which is a continuation of application Ser. No. 10/110,994, having a §371(c) filing date of Apr. 19, 2002 now abandoned, which is a 371 application of PCT/CH00/00562, filed Oct. 18, 2000, which claims benefit of priority to Application Nos. 9924746.2 filed on Oct. 19, 1999, and 9925458.3 filed on Oct. 27, 1999, in Great Britain; the above noted prior applications are all hereby incorporated by reference.

This invention relates to the production of topologically structured polymer films or coatings. These may find application as optical films or coatings and more particularly as orientation layers, optical retardation layers, anti-reflective coatings, and optical diffusers. The coatings typically exhibit sub-micron profiles such as pores, grooves, channels or stripes.

A known isotropic topologically structured polymer coating is taught by Walheim et al in 10 Science 283 (22 Jan. 1999) 520-2. A binary polymer blend (of polystyrene and polymethylmethacrylate dissolved in tetrahydrofuran) is allowed to demix to a controlled extent during spin coating onto a smooth substrate. By exposing the coated substrate to cyclohexane, which selectively dissolves polystyrene, a porous coating of PMMA is obtained. This coating can be modified by varying the materials and the demixing times, but no long-range order or patterning of the topological structure can be imposed on it.

It would be desirable to have a more versatile film or coating, with for example, the possibility to generate not only isotropic topological structure but also anisotropic topological structure with the capability to pattern said structure. Moreover this film or coating should exhibit high physical and chemical stability, and properties which are not critically dependant upon the demixing time or solvent.

Such films or coatings could then be used, for example, as orientation layers (in some cases as bistable orientation layers) for liquid crystals and liquid crystal displays. Other technical applications become also feasible such as the production of low effective refractive index layers usable as antireflective coatings, or of optically diffusive layers, and the production of optically anisotropic coatings (especially of liquid crystal polymers) leading to novel optical components. By using photo-alignment, photo-patterned grooved coatings are possible.

According to the present invention, a method of creating a topologically structured polymer film or coating comprises mixing at least two materials, applying the mixture to a substrate and removing at least one of the materials (for example, by using a solvent inactive towards the other material), characterized in that the one material is not cross-linkable and at least one other material is, that other material being cross-linked after application to the substrate and before use of the solvent.

A wide variety of substrates can be used, such as glass, plastics, metals, semiconductors or paper.

The cross-linking is preferably effected by exposure to light such as UV light, which may be polarized, and contributes to a good stability of the film or coating.

Preferably, the cross-linkable material comprises molecules of a rod-like (calamitic) shape. Advantageously, the cross-linkable material and the non-cross-linkable material have chemical structures that are similar, i.e. with a good compatibility regarding miscibility. More preferably, the cross-linkable material is liquid crystalline, and in such a case the non-cross-linkable material is also preferably mesogenic (liquid crystalline).

From the mixture it will be understood that a homogeneous transparent film may be formed and exposed to light, preferably UV light. During this process, the crosslinkable material is progressively being crosslinked, and the crosslinked material and the non-crosslinkable material demix gradually. After crosslinking has finished, the non-crosslinked material is removed with a selective solvent (or evaporated upon heating the layers) to create pores. In this way, it will be seen that layers/films/coatings having structures (holes, grooves, etc) on a sub-micrometer length scale can be obtained.

The non-cross-linkable material may contain a surfactant. The crosslinkable material may contain an additive such as a dichroic dye. Usefully, the cross-linkable material may be maintained in an oriented state during crosslinking, the orientation being imposed for example by an underlying orientation layer, which may be a photo-oriented layer such as an azo dye or linearly polymerized photopolymer, such being cheaper, simpler and much more versatile than a mechanically produced orientation layer.

The formation of topological structures is based on the control of the demixing (nanophase separation) of two molecularly mixed components forming a homogeneous phase during crosslinking. A decisive advantage of this process is that size, shape and distribution of the topological structures can be adjusted over a wide range by a suitable choice of the experimental parameters, which are in particular the kind of solvent(s), the ratio of the mixture, the concentration in the solvent, and intensity and duration, wavelength, angle of incidence and state of polarization of light.

Particularly, if the chemical structures of the crosslinking and the non-crosslinking materials are similar, and especially if a surfactant is added, a molecularly well mixed solution can be achieved, which additionally ensures that the crosslinking process is the main cause of demixing.

A further possibility to enhance the film homogeneity and the formation of nano-pores is the use, instead of one, of at least two solvents (Sol1 and Sol2) when preparing the mixture, whereby for instance Sol2 is a good solvent for the non-crosslinkable material and a poor solvent for the cross-linked material, e.g. hexane or ethanol, and Sol1 is a good solvent for the cross-linked material (may be a good or poor solvent for the non-cross-linkable material), e.g. ethylester. In this process, it is preferable in a first step to dissolve the cross-linked and the non-crosslinkable material in Sol1 and Sol2, respectively. Then the two obtained solutions are mixed and homogenized. Sol1 and Sol2 are preferably selected to be miscible with each other.

In a preferred embodiment the present invention provides a method to fabricate a modulated (almost periodic) topology. For this, the mixture, preferably comprising a liquid crystalline material, would be oriented. The orientation would induce elongation of the pores and lead to the formation of grooves (or channels, stripes, etc). Size and distribution of the "grooves" can be varied from a few nm to few μm depending on the preparation parameters (such as mixture, light irradiation time, temperature . . . ).

In principle, any method to orient the mixture can be used, such as employing a layer that induces an alignment of adjacent liquid crystal material. Particularly suitable are orientation layers made by photo-orientation methods (usually using linearly polarized light), and especially well suited are linearly photo-polymerized (LPP) orientation layers, also known as photo-oriented polymer networks (PPN), among other things because these layers can be easily applied also to non-planar surfaces. Such methods are for instance disclosed in U.S. Pat. No. 4,974,941 Gibbons et al, U.S. Pat. No. 5,838,407 Chigrinov et al, and U.S. Pat. No. 5,602,661 Schadt et al. An other possibility would be to use a mixture that itself contains a photo-orientable component. Examples of this kind of orientation method can for instance be found in the International Application PCT/IB99/01001 (ROLIC) filed 3 Jun. 1999.

Useful multilayer structures (especially in the field of bistable alignment) can be obtained if the first layer according to the invention has an aligned topological structure which is preferably aligned not parallel to the orientation of the cross-linked material (although parallel is possible for increased anchoring), the orientation and the alignment preferably being at right angles to each other. In these cases, the alignment and crosslinking of the second layer may be induced by linearly polarized UV light. The UV light illumination can be adjusted such that the anchoring forces from the alignment and from the orientation are competitive with each other.

In the method according to the invention the two materials may be dissolved in respective solvents before mixing, the solvents being mutually miscible but each being a poor solvent for the other solute.

The cross-linkable material may be present in a proportion of 1/10 to 30 parts, preferably 1/4 to 4 parts, by weight per part of non-cross-inkable material, the latter being destined for dissolution out of the finished coating.

The invention extends to a topologically structured polymer film or coating which has been created by a method as set forth above. In such a film or coating the structure may comprise hollows at least 99% of which are smaller than 1000 nm, preferably smaller than 500 nm, and more preferably smaller than 200 nm in at least one direction parallel to the coating plane. It will be understood that the hollows may arise from dissolving out the non-cross-linked material from the coating. The average distance between adjacent hollows is typically less than 500 nm, and the hollows may be elongated, which may be understood to be a result of orientation in the cross-linked material. In most applications, the coating, and in many also the substrate, are optically transparent.

Preferably the substrate already has an aligned structure, achieved for example by employing a layer that induces an alignment of adjacent liquid crystal material. Particularly suitable are orientation layers made by photo-orientation methods (usually using linearly polarized light), and especially well suited are linearly photo-polymerized (LPP) orientation layers. Also the aligned structure could alternatively be achieved by rubbing, brushing or other mechanical means. The said coating is applied thereto with an orientation which may be at from 0° to 90° to that alignment, or wherein this angle is different in different parts of the coating, optionally pixelwise.

The invention also provides a topologically structured polymer film or coating on a substrate, comprising, as the coating, a material which has hollows and/or topological structure, characterized in that the material is crosslinked. The hollows and/or structure may be such as could have arisen from the presence of another material which was then removed.

The invention also provides an optical retarder comprising such a film or coating on a substrate, as explained by way of example later.

The invention extends to a topologically structured polymer film or coating which acts as an optical diffuser. In this case, the holes or grooves as a rule have dimensions in the order of the wavelength of light.

The invention also extends to the superimposition of two or more layers, preferably in the form of a stack or multilayer.

The invention also provides an optical component, howsoever made, comprising a substrate bearing a transparent liquid crystal polymer layer which is aligned at from 0° to 90° (preferably at 90° for the most interesting competition between two stable alignments) to the grooves and which has hollows within its thickness spaced on average less than 50° nm apart, 99% of said hollows being less than 500 nm across and being at least twice as long as they are across. Parallel alignment (i.e. "0°") is possible, for example for high anchoring energy applications.

The invention extends to an assembly comprising a layer of alignable molecules in contact with a coating or optical component as set forth above, the molecules being aligned thereby.

The invention further extends to an antireflectively coated object comprising a coating or component as set forth above and to a liquid crystal cell wherein the liquid crystal molecules can adopt one of at least two different stable alignments in contact with a wall of the cell, the cell wall comprising a coating or component as set forth above.

The invention further extends to an optical display device, preferably a liquid crystal display, comprising a film or coating as set forth above.

Furthermore, the invention also provides elements for protection against forgery and copying.

Some applications of the invention will be described by way of illustration.

Antireflective coatings for the visible spectral region are required whenever light reflection of a surface is to be reduced or avoided. An example is the undesirable reflection of the glass of a display device. The basic principle of such coatings can be understood in terms of destructive interference between light reflected from air-film and film-substrate interfaces. Glass or plastic substrates, for example, require a coating film with a low effective refractive index $n_{eff} \cong 1.2$. However, because of a lack of suitable low-refractive-index materials, this requirement cannot be realized with homogeneous single-layer coatings, and therefore multilayer coatings are usually used.

As an alternative to multilayers, it is known that porous films can be used to reduce reflections at optical wavelengths. (Many others have studied this so-called "moth-eye" effect.) To a first approximation, provided the pore size is less than $\lambda_0/4$ ($\lambda_0$ is the wavelength in the free space), the layer will appear as a continuous film with an effective refractive index given by an average over the film. Therefore, the challenge is to maximize the volume fraction of the pores in order to obtain very low $n_{eff}$. It is the grading of the apparent refractive index that gives rise to the reduction in the reflection coefficient. Based on this idea different approaches have been developed including sol-gel method, surfaces patterned with sub-micrometer gratings, superposition of sub-micro particles and the use of polymer blends.

The invention provides a method to produce nano-porous crosslinked films using a simple process applicable to planar and especially also to non-planar surfaces. This process is based on the control of the phase separation of molecularly mixed compounds on the nanometer length scale. Depending on the preparation parameters, size, shape and volume fraction of pores can be accommodated. Using ellipsometric measurements we found that the effective refractive index ($n_{eff}$) of such layers can also be adjusted and decreased down to 1.2 or lower. Therefore the reflection coefficient off glasses can be efficiently reduced.

Figure 3:
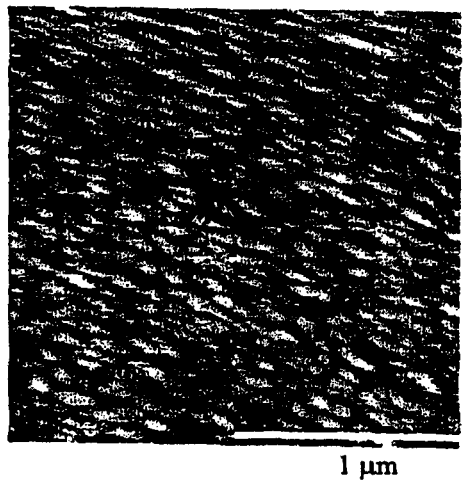
Figure 3:
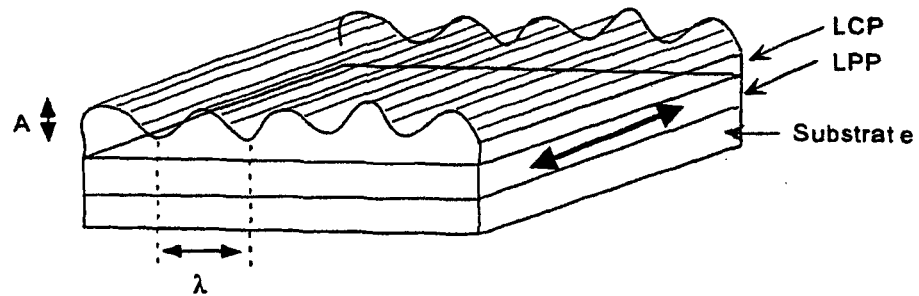
Figure 3:
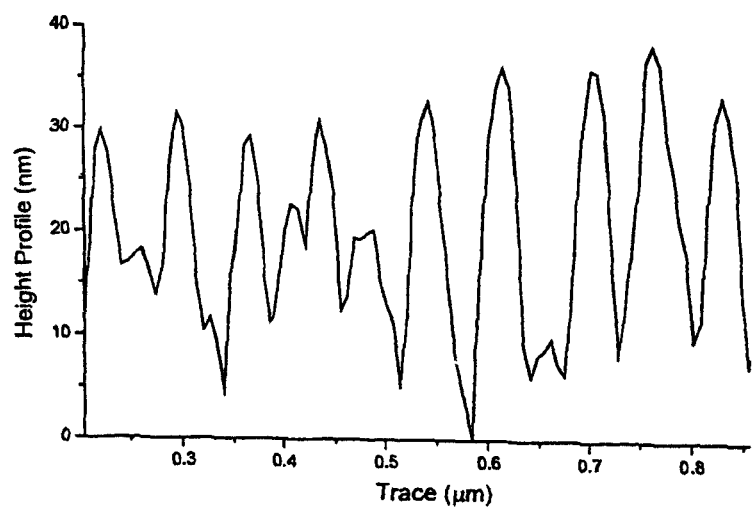

A further advantage is the usually from top to bottom continuously narrowing shape of the pores/hollows (cf FIG. 3c described in more detail later), because such "gradient hollows" have the effect that the refractive index changes continuously over the depth of the hollows, which in turn makes effective antireflection possible over a broad spectral region with only one layer.

Furthermore, if layers having an elongated, grooved structure according to a special embodiment of the invention as described above are used, the elongated structure also affects the effective refractive index and makes it direction-dependent. Such layers can therefore also be used as antireflection layers that are sensitive to the angle of incidence.

Orientation layers: It is known that grooved surfaces can produce uniform and parallel alignment of liquid crystals due to anisotropic surface interactions. It is believed that this is because the periodic topology of mechanically grooved substrates minimises the elastic deformation energy of the liquid crystals by forcing the director to align along the grooves. Grooves are traditionally produced by rubbing (glasses plates, polymer layers, ... ), unidirectional polishing, tangential evaporation, tangential ion-beam etching of oxides, or formation of a grating on the substrate. Although mechanical alignment is relatively simple, the techniques used to produce the grooves are, however, difficult to implement, involve expensive equipment, and are relatively slow. Furthermore, brushing (rubbing) processes have several inherent disadvantages such as the generation of dust particles and static surface charges. Another limitation is that mechanical alignment is a large-scale process and therefore not adapted to generate local variations (patterns) of the surface director, certainly not on the pixel scale.

Films or coatings of crosslinked layers made according to the invention, oriented as described above, show oriented grooves and therefore may be used as orientation layers for an adjacent liquid crystal material. It is believed that the alignment effect on liquid crystals is caused by the topology of the crosslinked layer, quite similar in effect to a brushed orientation layer.

Mixed (bistable) anchoring: The invention furthermore makes possible a mixed alignment, i.e. an orientation layer that at any given spot possesses two (or more) different orientation directions at the same time. Such an orientation layer may for instance be used to generate a bistable (or multistable) liquid crystal anchoring system.

For this, anchoring competition between two (or more) superposed layers is used. One is a topologically structured film or coating according to the present invention, which tends to impart a liquid crystal alignment through its topology (nano-grooves) by mechanisms described above. The other is a photo-oriented orientation layer, preferably a linearly polymerized photopolymer (LPP) film, on top of the topologically structured film or coating, inducing a competing liquid crystal alignment in a direction different from the anchoring direction of the topologically structured film or coating, for instance perpendicular to it.

Depending on the thicknesses of the two superposed layers, the size of the "grooves" ($A$, $A_{eff}$ and $\lambda$, see FIG. 4) and the light irradiation direction, it is possible to find a range of parameters which gives rise to bistable anchoring.

Use as optical retarders: It is known that for a layer with modulated surface profile, such as linear gratings or porous films with an inclined columnar structure formed in vapour deposition processes at an oblique angle, the apparent dielectric constant (also called the relative permittivity) as a function of depth will be different for light polarized parallel or perpendicular to the grating. Such films can be birefringent and have been proposed for construction of phase retardation plates.

Since the present invention provides a method to produce topologically structured liquid crystal polymer (LCP) layers, it also gives a new possibility to make special optical retarders. For such modulated surface profile LCPs there is, in addition to the intrinsic anisotropy of the LCP material ($\Delta n_{LCP}$), a geometric contribution ($\Delta n_{grooves}$) to the apparent optical anisotropy (or correspondingly to the apparent dielectric constant anisotropy). This will modify the overall apparent anisotropy of the LCP layer (often one can approximately think of $\Delta n_{eff} \approx$ "$\Delta n_{Lcp} + \Delta n_{grooves}$"). Depending on the volume fraction of the grooves, it is possible to increase $\Delta n_{eff}$ up to 50% or even more. The modification to the polarization of the transmitted ray is particularly of use in the fabrication of optical components such as retarders, waveplates, etc, where in this way a high $\Delta n$ can be achieved from lower $\Delta n$ materials.

Use as optical diffusers: Optical films with different refractive indices along certain film axes may have a substantial diffuse component to their reflective and transmissive properties. Known examples are stretched polymers filled with inorganic inclusions not small compared to the wavelength of light, stretched polymer dispersed liquid crystals (PDLCs) or polymer blends. The mismatch in the refractive index along a particular axis has the effect that incident light polarized along that axis will be substantially scattered. In contrast, incident light polarized along an axis in which the refractive indices are matched will be transmitted or reflected with a lesser degree of scattering.

Suitably adapted embodiments of the invention can be used also in this application field. The invention provides topologically structured polymer films or coatings with controllable dimensions and refractive indices along certain film axes. Typically, the topologically structured (LCP) layers possess a quite large refractive index mismatch of about 0.5 (i.e. the difference in refractive indices between the holes or grooves (air) and the polymer matrix). Therefore, with dimensions of the holes or grooves in the order of the wavelength of light, a substantial diffuse reflection is attained. In general, the size of the structures should be less than several wavelengths in at least one direction if diffuse reflection is desired. By suitably choosing the values of parameters such as the size (with respect to wavelength within the film) and shape (interfacial geometry or topology) of the holes or grooves, their volume fraction, the film thickness, and consequently the degree of the refractive index mismatch, a desired degree of diffuse reflection and total transmission of light—in a defined direction—is achievable. Furthermore, the value of the refractive index mismatch, can be additionally controlled by varying the birefringence of the (LCP) material used.

It is furthermore possible to orient (as described above) such films or coatings and thereby control the optical properties, with the additional possibility of patterning. This allows to manipulate the refractive index mismatch to achieve desirable degrees of diffuse and specular reflection and transmission along a defined viewing direction and/or viewing cone. Furthermore, by tailoring the geometry of the grooves and/or the patterns, also the distribution of scattered light can be influenced.

Topologically structured polymer films or coatings according to the invention, which have optically diffusing properties, can be utilized to make a variety of optical devices. Examples are (polarizing) diffusers and reflectors, as well as special configurations for the improvement of the performance of liquid crystal displays, particularly with respect to brightness, viewing characteristics, and parallax. The films or coatings can be used as—isotropic or anisotropic—diffusers inside various display types, and as—isotropic or anisotropic—front scattering films or—isotropic or anisotropic—diffusing reflectors for reflective liquid crystal displays. As reflective polarizers, they are particularly useful to increase the contrast, to reduce the glare, or to enhance the polarization of light. Advantageously, they can also be used as electrodes (optionally pixelwise). Furthermore, because of their topological structure, they can be used as orienting layers for liquid crystals or other materials to be oriented. A further application are authentication elements (e.g. to safeguard banknotes, credit cards, securities, identity cards and the like against forgery). They can for instance be highly reflective only for certain viewing angles thus providing a tilting effect to the observer, and with a specific pattern even a sign or picture is possible.

By controlling the amount of orientation or by writing with laser light during the cross-linking process, the invention provides also a possibility to make periodic structures, for instance optical gratings. In addition, combinations of laser written periodic structures and alignment produced (patterned) structures are feasible. Advantageously, in this way new topologically anisotropic structured coatings can be made, having optical properties combining both scattering and diffraction effects.

The highly scattering direction with respect to the grooves direction depends on several parameters such as the anisotropy of the LCP used (with respect to both the magnitude and sign). For example, anisotropic structured LCP coatings fabricated using LCPs with positive anisotropy ($\Delta n$), aligned along the grooves direction, scatter the incident light in the direction parallel to the grooves direction strongly due to the larger index mismatch, while the components of the incident light in the direction perpendicular to the grooves will transmit through the film with less disturbance. As a result, the unpolarized light will be partially polarized after passing through the film. Extinction ratio of such coatings can have values of about 2 or higher, and even higher extinction ratios can be achieved by adjusting the film thickness, the volume fraction and size of the grooves, and the degree of index match and mismatch through the use of materials with a well defined birefringence and/or the use of dyes with specific absorption axis with respect to the groove's direction. By adjusting the period and the length of the grooves, the coating can also be made anti-reflective in one direction and scattering in another direction. This enables the fabrication of low loss polarizers with high extinction ratio useful for polarization-sensitive optical elements. The scattering and/or polarizing properties can be further improved using the superposition of two or more layers, for instance by coating a substrate on both sides, by multilayers, or a stack of layers. Depending on the desired property (brightness, viewing angle, polarization efficiency, etc.) the topological structure of each layer can be made similar or not, with the grooves directions in the successive layers equal to or different from each other. Additionally, an—isotropic or an anisotropic—anti-reflection coating may be used to reach high values of transmission.

The topologically structured polymer films or coatings according to the invention can be over-coated, without destroying the topography, with various materials such as polymers, metals, dielectrics, etc. Furthermore, special over-coatings can be used to manipulate the topological or optical properties of the final coating. Coatings covered with a metal layer, for example, can be used to fabricate diffusing reflectors or reflection polarizers. Other optical elements, such as UV filters or UV polarizers and infrared polarizers, become also feasible.

In another aspect of the invention, the topologically structured films or coatings can be used as a master to make replica of isotropic or anisotropic topological structures of various materials such as metals, pre-polymers, polymers, dielectrics, etc. For this purpose, the desired material (e.g. aluminium) will be applied onto the film or coating, optionally further handled (e.g. heated, exposed to light, coated, etc.) to achieve specific performances, and then separated from the underlying film or coating.

It is a further advantage of the films or coatings according to the invention that they can be easily coated to a variety of devices or substrates such as paper, plastic, metal, dielectric, etc., and that it is also possible to transfer them from one substrate to another. For the transfer, for example known hot stamping techniques are suitable, using a commercially available transfer film as a substrate.

After transferring a film or coating according to the invention, it can advantageously be coated on it's underside with another material.

The invention will now be described by way of example with reference to the accompanying drawings, in which:

FIG. 1 gives atomic force microscope (AFM) images of three nano-porous anti-reflection LCP films being coatings according to the invention. These are transparent with low effective refractive index and different pore size lower than the visible wavelength: (a) pores with an average diameter of 200 nm and a height of 90 nm, (b) pores with an average diameter of 180 nm and a height of 120 nm, and (c) pores with an average diameter of 100 nm and a height of 50 nm.

FIG. 2(a) shows the variation of the effective refractive index, $n_{\it eff}$, as a function of the wavelength. The open circles correspond to the layer from Example 3 (FIG. 1c) and the solid squares correspond to the layer from Example 1 (FIG. 1a). FIG. 2(b) shows light transmission versus wavelength of an anti-reflective layer from Example 2 (FIG. 1b). The glass substrate used was coated on one side with the anti-reflective layer. The figure demonstrates a relatively broad-band anti-reflective LCP layer with almost zero % reflection (since 96% transmission is achieved for one coated glass side).

FIG. 3(a) is an example of an atomic force microscope image of the obtained nano-grooves from Example 4 and FIG. 3(b) is a corresponding sketch of the nanogrooved structure; the double-arrow indicates the aligning direction of the LPP layer. The values of the period $\lambda$ and the height A of the grooves can be tuned. FIG. 3(c) is an AFM cross-sectional profile of the LCP layer along the trace indicated as a black line in FIG. 3(a).

FIG. 4(a) is a schematic view of an LCP-LPP layer used to obtain a mixed alignment, showing a grooved LCP layer with an aligning direction along the x axis, covered by an LPP layer with an aligning direction along the y axis, wherein the LPP layer had partially filled the LCP grooves and reduced their height from A=40 nm to $A_{\it eff}$=10 nm. FIG. 4(b) shows a mixed alignment observed between crossed polarisers (from Example 6), two different regions being observed having two different colours corresponding to the two anchoring directions, these colours becoming inverted between these two regions when the sample is rotated by 45°.

FIG. 5(a) is a plot of the ordinary ($n_o$) and extraordinary ($n_e$) refractive indices of the layers from Example 7 according to wavelength, as determined from ellipsometry measurement, FIG. 5(b) shows a comparison of the optical anisotropy ($\Delta n = n_e - n_o$) of the nano-grooved LCP layer from Example 7 (squares) with that of a corresponding LCP layer without grooves (circles), according to wavelength, and FIG. 5(c) is a plot of light transmission versus viewing angle of s-polarized light (solid squares) and p-polarized light (open triangles) of a glass slide coated on one side with an anti-reflective LCP layer from Example 7.

FIG. 6(a) is an optical microscopy photograph taken between crossed polarisers of an optically patterned nanogrooved LCP layer from Example 8, with two aligning directions $a_1$ and $a_2$ in adjacent pixels of size 100×100 μm; FIG. 6(b) is the corresponding atomic force image taken in region $a_2$; FIG. 6(d) is that taken in regional and FIG. 6(c) shows the interface between these two regions.

Figure 7:
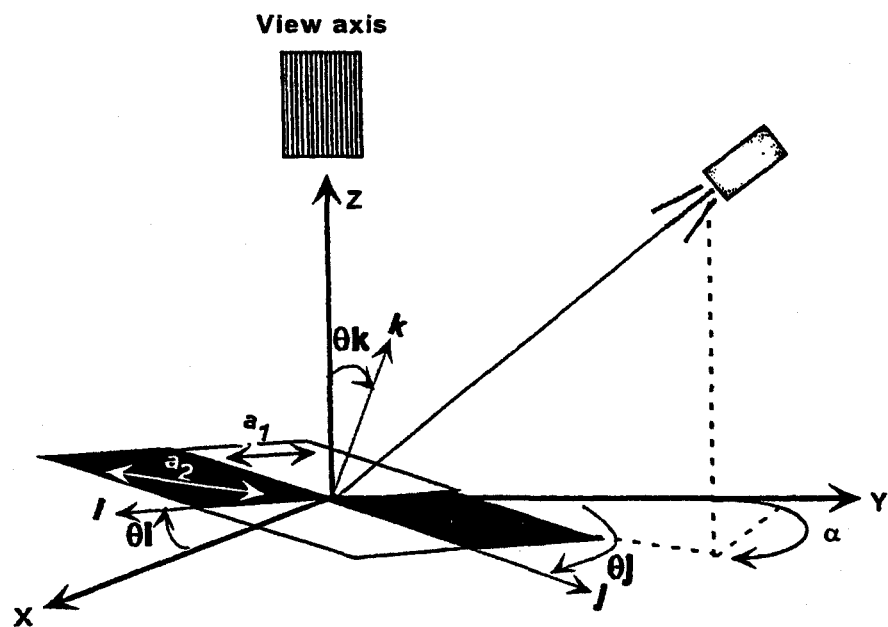
Figure 7:
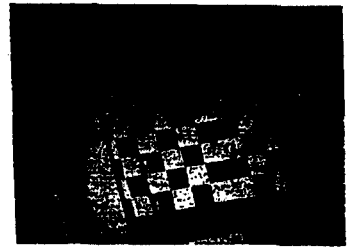
Figure 7:

FIG. 7(a) is a schematic representation of an optically patterned (grooved) LCP layer from Example 10, with two aligning directions $a_1$ (parallel to the i axis) and $a_2$ (making an Example 11 taken in regional (left) and that taken in region $a_2$ (right).

EXAMPLE 1

Making a Layer being a Coating According to the Invention

A mixture Mix1 was prepared containing an LCP pre-material (photocrosslinkable liquid crystal pre-polymers) and a non-photocrosslinkable nematic liquid crystal material. The LCP components, denoted Monomer 1, Monomer 2 and Monomer 3 are crosslinkable diacrylate monomers, and the non-crosslinkable component, denoted 5CAPO2, is a non-crosslinkable nematic liquid crystal monomer.

Monomer 1:

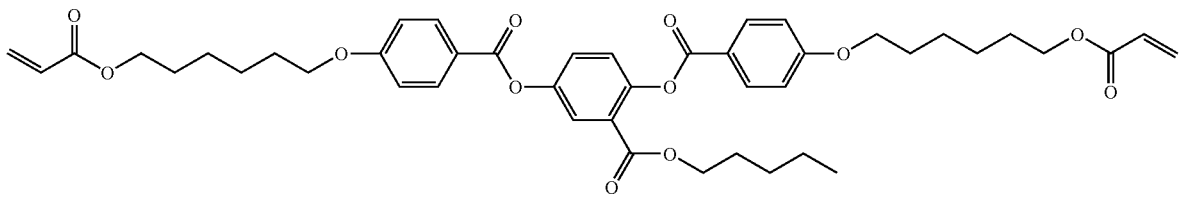

Monomer 2:

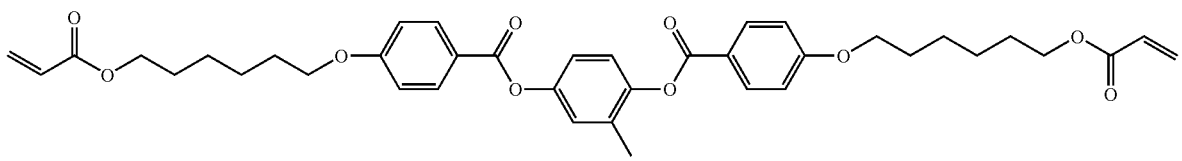

Monomer 3:

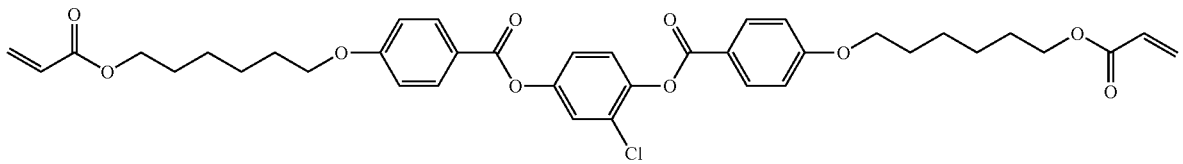

5CAPO2:

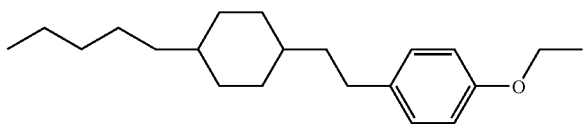

angle of 45° with respect to the i axis) in adjacent pixels as indicated; XYZ represent the laboratory frame axes (with Z the view axis), and ijk are the substrate frame axes (with k normal to the substrate); θi, θj and θk are the angles between i and X axes, j and Y axes, and k and Z axes, respectively; the angle (α) define the illumination direction, with respect to the YZ plane. FIG. 7(b) shows two photographs illustrating the viewing angle dependence of the reflected light from an optically patterned "grooved" LCP layer prepared as described in Example 10, with a polarizer (polarization axis parallel to Y) placed between the substrate and the camera; the bright areas in the left image correspond to region $a_2$, and those in the right picture to regional.

FIG. 8(a) shows various photographs illustrating the illumination and viewing angle dependence of the reflected light from an optically patterned "grooved" LCP layer from Example 11; FIG. 8(b) are corresponding atomic force microscopy images (10×10 m scan) of the coating from Mix1 was made from:
58.9 Wt %=52.6 mg of Monomer 1
13.0 wt %=11.6 mg of Monomer 2
4.3 wt %=3.8 mg of Monomer 3
9.3 wt %=8.3 mg of 5CAPO2
12.1 wt %=10.8 mg of Ethanol
1.2 wt %=1.1 mg of a photoinitiator (Irgacure (trade mark) 369 by CIBA), and
1.2 wt %=1.1 mg of BHT (butyl hydroxy toluene) as an inhibitor.

A 1.5 wt % solution of mixture Mix1 was made in ethyl acetate, then homogenized with moderate stirring for 15 min using ultrasonic vibrations (with a Sonifier (trade mark) "W-250" digital by BRANSON Ultrasonics Corporation), and filtered trough a 0.2 μm filter.

Figure 2:
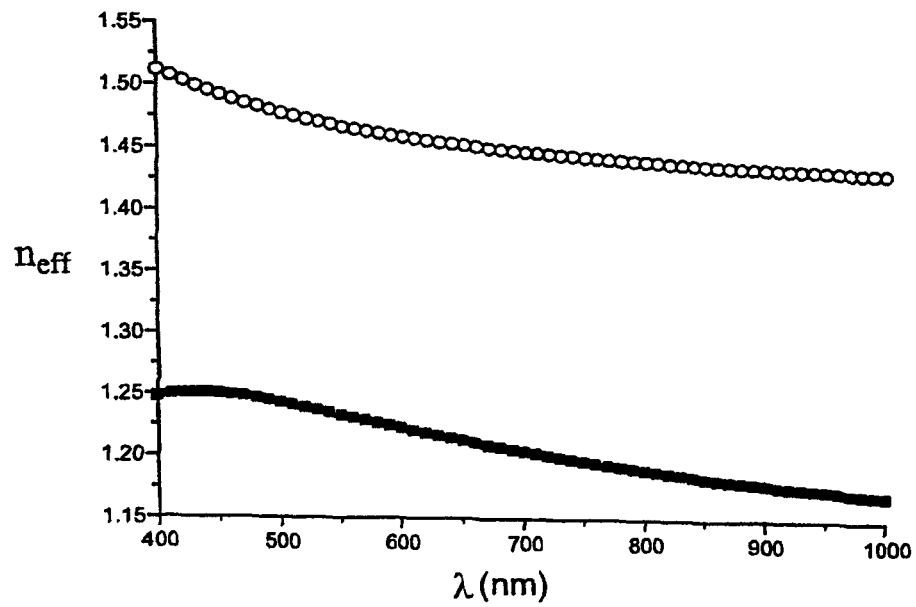
Figure 2:
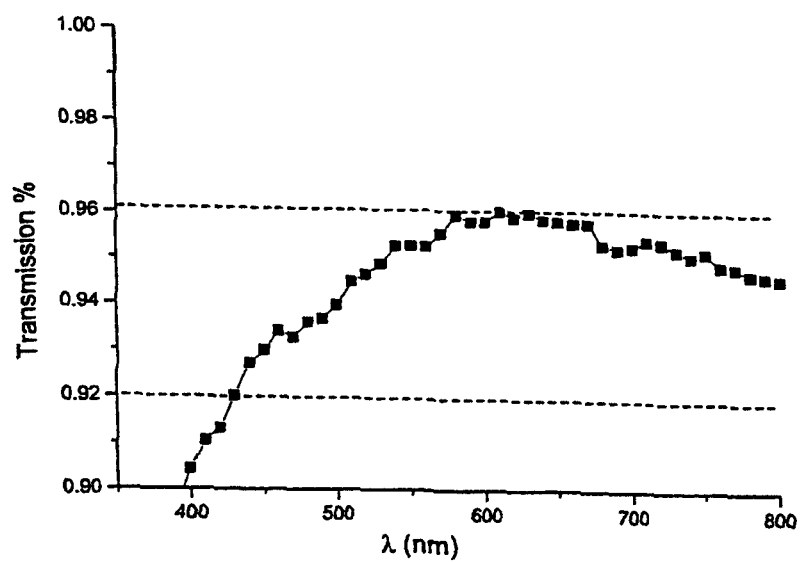

The solution was then thinly spin coated at 1000 rpm onto glass plates. The plates were warmed for 1 minute at 50° C. on a hotplate. The layers were then irradiated for 5 minutes under nitrogen at room temperature by isotropic (not-polarized)

light from a mercury lamp at an intensity in the ultraviolet of 4.1 mW/cm² to crosslink the LCP monomers. The layers were optically transparent. Finally, the layers were rinsed with ethyl acetate to remove the non-crosslinked material. After this procedure, the layers were still transparent. The total thickness of the resulting anti-reflection LCP layer was about 90 nm. Using contact-mode Atomic-Force-Microscopy (AFM), the layers were found to contain nano-pores (FIG. 1-a). The pores have an average diameter of about 200 nm and an average height of about 90 nm. The effective refractive index of the resulting anti-reflection LCP layers was evaluated, at optical wavelengths between 400 nm and 1000 n, using a Variable Angle Spectroscopic Ellipsometer (V. A. S. E. from J. A. Woolam Co., Inc. Research & Instrumentation, Lincoln, Nebr. USA). An example of the results is shown in FIG. 2-a (solid squares).

EXAMPLE 2

Varying the Component Ratio

A mixture Mix2 was made from:
29.6 wt %=35.5 mg of Monomer 1
6.8 wt %=8.1 mg of Monomer 2
2.2 wt %=2.7 mg of Monomer 3
35.9 wt %=43.1 mg of 5CAPO2
24.3 wt %=29.1 mg of Ethanol
0.6 wt %=0.68 mg of a photoinitiator (Irgacure (trade mark) 369 by CIBA), and
0.6 wt %=0.68 mg of BHT (butyl hydroxy toluene) as an inhibitor.

A 7.8 wt % solution of the mixture Mix2 was made in ethyl acetate, then homogenized with moderate stirring for 15 min using ultrasonic vibrations (with a Sonifier (trade mark) "W-250" digital by BRANSON Ultrasonics Corporation), and filtered trough a 0.2 μm filter. The solution was then thinly spin coated at 3000 rpm onto glass plates. The layers were then irradiated for 5 minutes under nitrogen at room temperature using isotropic (non-polarized) light from a mercury lamp at an intensity in the ultraviolet of 4.5 mW/cm² to crosslink the LCP monomers. The layers were optically transparent. Finally, the layers were rinsed with a solvent to remove the non cross-linked material. After this procedure, the layers were still transparent. The total thickness of the resulting anti-reflection LCP layer was about 120 nm. Using contact-mode AFM, the layers were found to contain nano-pores. The pores have an average diameter of about 180 nm and an average height of about 120 nm (see FIG. 1-b). The transmission of the resulting nano-porous LCP layer was evaluated, at optical wavelengths between 400 nm and 1000 nm, using a Variable Angle Spectroscopic Ellipsometer (V. A. S. E. from J. A. Woolam Co., Inc. Research & instrumentation, Lincoln, Nebr. USA). The results showed the high-performance anti-reflection of the LCP layers with zero % reflection in a wide wavelength region of the visible light (cf FIG. 2-b).

EXAMPLE 3

Again Varying the Component Ratio

A mixture Mix3 was made from:
20.2 wt %=35.9 mg of Monomer 1
3.8 wt %=6.7 mg of Monomer 2
1.3 wt %=2.3 mg of Monomer 3
18.2 wt %=32.3 mg of 5CAPO2
55.3 wt %=98.4 mg of Ethanol
0.62 wt %=1.1 mg of a photoinitiator (Irgacure (trade mark) 369 by CIBA), and
0.62 wt %=1.1 mg of BHT (butyl hydroxy toluene) as an inhibitor.

A 4.7 wt % solution of the mixture Mix3 was made in ethyl acetate, then homogenized with moderate stirring for 30 min at 50° C., and filtered through a 0.2 μm filter. The solution was then thinly spin coated at 1000 rpm onto glass plates. The layers were then irradiated for 5 minutes under nitrogen at room temperature using isotropic (non-polarized) light from a mercury lamp at an intensity in the ultraviolet of 4.5 mW/cm². After this irradiation, the LCP monomers had become cross-linked. The layers were optically transparent. Finally, the layers were rinsed with ethyl acetate to remove the non cross-linked material. After this procedure, the layers were still transparent. The total thickness of the resulting anti-reflection LCP layer was about 120 nm. Using contact-mode AFM, the layers were found to contain nano-pores. The pores have an average diameter of about 100 nm and an average height of about 50 nm (see FIG. 1-c).

EXAMPLE 4

Preparation of an LCP Layer According to the Invention on an Orientation Layer, Leading to a Modulated Profile "Nano-Grooved" Topological Structure A 2% solution of the photo-orienting material JP 265 (commercially available from CIBA), which is a linearly photo-polymerizable polymer (LPP), in cyclopentanone was thinly spin coated at 3000 rpm onto glass plates. The plates were warmed for 10 minutes at 180° C. on a hotplate. The resulting layer had a thickness of about 60 nm and was then irradiated for 30 seconds at room temperature with linearly polarized UV light from a 200 W mercury high pressure lamp. The polariser was a film polariser HNP'B by Polaroid. The wavelength of the light was further limited by a UV filter WG295 (Schott) and a bandpass filter UG11 (Schott). The intensity of the UV light at the plate was determined as 1 mW/cm².

The thus prepared orientation layer was then spin coated with the solution from Example 3 using the same experimental treatment. The resulting layers were transparent before and after rinsing with the solvent. The total LCP film thickness was about 120 nm. Using contact-mode AFM it was found that instead of substantially round pores nano-grooves (or -channels) are formed, which are elongated in the direction of the underlying LPP orientation layer (which is in this case also the direction of the polarization of UV light which had irradiated the LPP layer). The grooves had an average period (λ) of about 100 nm and an average height (A) of about 40 nm (cf FIG. 3).

EXAMPLE 5

Use of the Grooved LCP Layer of Example 4 as an Orientation Layer in an LCD Cell With the coated sides facing inwards, two plates from Example 4 were assembled into a TN-LCD cell with a twist angle of 90° (and a parallel-sided cell with a twist angle of 0°, respectively), using glass spheres of 5 μm thickness as spacer. The cell was filled with a nematic liquid crystal mixture MLC 12000-00 (Merck) at a temperature slightly above the nematic-isotropic transition temperature (89° C.), and slowly cooled. Observation of the prepared cells between crossed polarisers showed that the liquid crystal is uniformly oriented. Using a polarization microscope, the orientation direction which the coated plates had imposed on the nematic mixture was established to be substantially parallel to the "grooves" direction.

EXAMPLE 6

Making a Hybrid (Mixed) Orientation Layer

A 1% solution of the photo-orienting LPP material JP 265 (from CIBA) in cyclopentanone was thinly spin coated at 4000 rpm onto the coated side of the plates from Example 4, i.e. on an LCP layer having a grooved topology with an average height (A) of the grooves of about 40 nm. After the coating, AFM investigation showed that the photo-orienting layer (LPP layer) covered the LCP layer completely, as sketched in FIG. 4-a, and that the nano-grooves still existed. The result was an LCP-LPP layer whose grooves had an average period ($\lambda$) of about 100 nm and an average effective height ($A_{eff}$) of 10 nm.

The plates were warmed to 180° C. for 10 min, then irradiated at room temperature with linearly polarized UV light from a 200 W mercury high pressure lamp. The polariser was a film polariser HNP'B by Polaroid. The wavelength of the light was further limited by a UV filter WG295 (Schott) and a bandpass filter UG11 (Schott). The intensity of the UV light at the plate was determined as 1 mW/cm². In order to demonstrate the aligning competition between the two superposed layers, we used the fact that the aligning effect of the photo-orienting LPP increases with increasing duration of irradiation. Therefore, the layers were subdivided into different sections, each one irradiated for a fixed period of time ranging from 3 seconds to 10 minutes. The direction of polarization of light was laying in the plane perpendicular to the plates and to that of the "grooves" direction as sketched in FIG. 4-a.

With the coated sides facing inwards, the LCP-LPP coated plate was assembled into a TN-LCD cell using as the second plate a plate that has been coated with a single orientation layer of the photo-orienting material JP 265 (prepared according to the procedure given in Example 4) and glass spheres of 5 μm thickness as spacers. The anchoring direction of the second plate was fixed at an angle of 45° with respect to the direction of the grooves of the first plate. The cell was filled with a nematic liquid crystal mixture MLC 12000-00 (Merck) at a temperature slightly above the nematic-isotropic transition temperature (89° C.), and slowly cooled.

Observation of the prepared cells between crossed polarisers showed that the nematic liquid crystal in the cell is uniformly oriented over all the different sections of the cell corresponding to different UV irradiation time. Using a polarization microscope, it was found that the orientation direction of the liquid crystal was parallel to the direction of the grooves of the LCP-LPP coated plate in sections where the UV illumination time was short (less than 25 seconds). For sections where the UV illumination time was long (longer than 5 min), the orientation direction of the liquid crystal was established to be parallel to the orientation direction of the LPP layer superposed to the grooved LCP layer, i.e. the orientation of the liquid crystal was perpendicular to the direction of the grooves.

Figure 4:
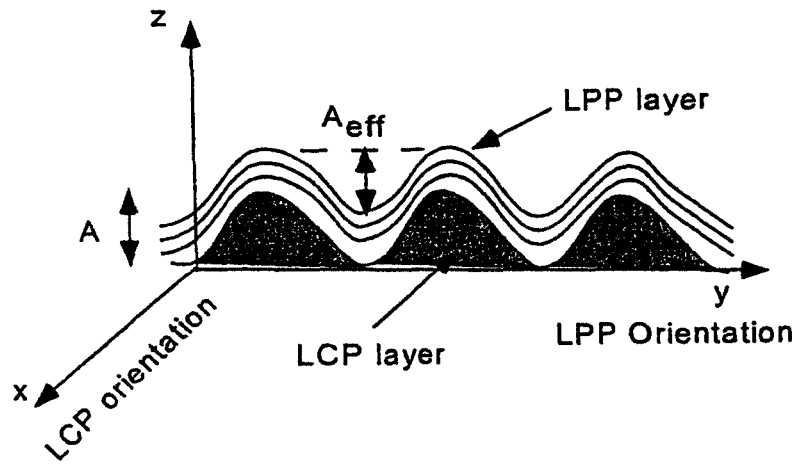
Figure 4:
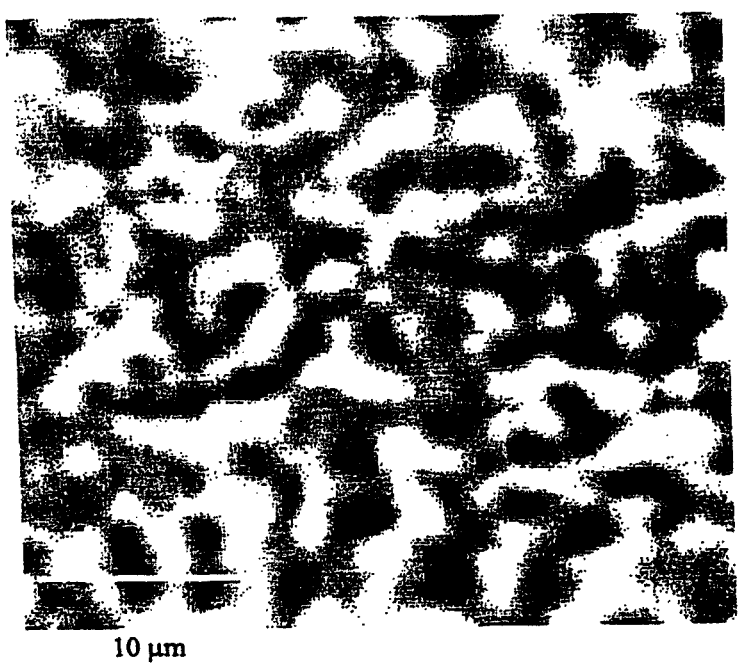

Observation under cross-polarisers using a polarising microscope showed that for sections where the UV illumination time was of medium duration (between 25 seconds and 5 minutes), the cell contained both orientations corresponding to two different colours (see FIG. 4-b). By rotating the cell, it was possible to pass from one colour (orientation) to the other by rotation through an angle of 45°. Thus, the aligning competition, if properly adjusted, can be used to generate bistable anchoring of liquid crystals.

EXAMPLE 7

Making an Optical Retardation Layer with Artificially High Effective Anisotropy

A mixture Mix4 was made from:
17.0 wt %=36.2 mg of Monomer 1
3.2 wt %=6.8 mg of Monomer 2
1.1 wt %=2.3 mg of Monomer 3
19.2 wt %=40.8 mg of 5CAPO2
58.5 wt %=124.3 mg of Ethanol
0.5 wt %=1.05 mg of a photoinitiator (Irgacure (trade mark) 369 by CIBA), and
0.5 wt %=1.01 mg of BHT (butyl hydroxy toluene) as an inhibitor.

A 6.7 wt % solution of mixture Mix4 was made in ethyl acetate, then homogenized with moderate stirring for 30 min at 50° C., and filtered trough a 0.2 μm filter.

Example 4 was repeated using the above solution. The layers were transparent before and after rinsing with the solvent. The total LCP film thickness is about 110 nm. AFM investigations showed the formation of "nano-grooves", which had an average period ($\lambda$) of about 150 nm and an average height (A) of about 75 nm.

Using a tilt compensator and a polarization microscope, the layer was found to have an optical retardation of about 19 nm, which corresponds to an effective optical anisotropy of about 0.17. It was also established that the orientation of the optical axis all over the layer was parallel to the orientation direction of the LPP layer.

Figure 5:
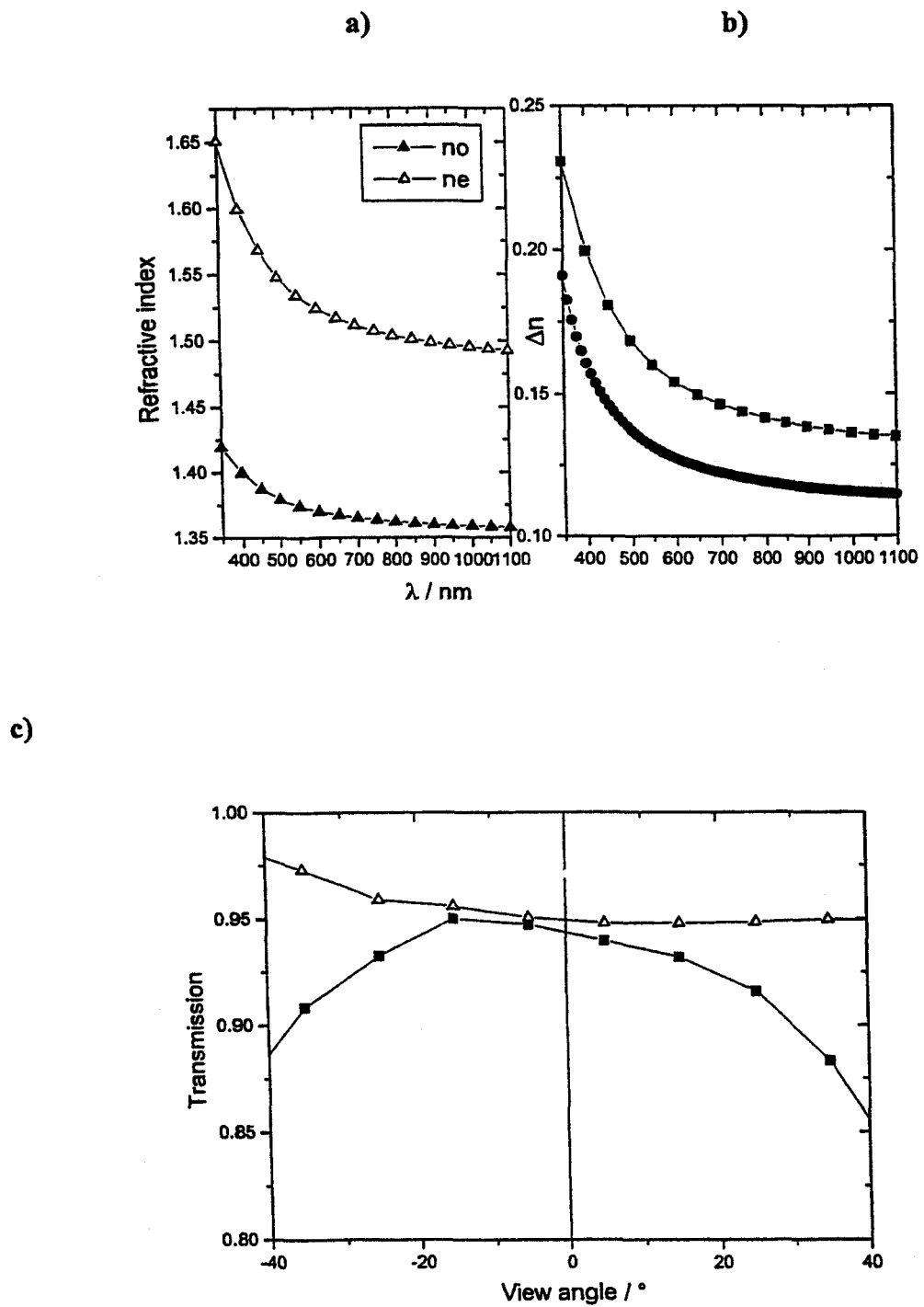

This finding was further confirmed with ellipsometric measurements. FIG. 5 shows an example of the results obtained. FIG. 5-a gives the ordinary ($n_o$) and extraordinary ($n_e$) refractive indices versus wavelength of the layers from the present example; FIG. 5-b gives in squares the corresponding optical anisotropy $\Delta n = n_e - n_o$, and by way of comparison in circles the optical anisotropy of a corresponding LCP layer without grooves.

In addition, FIG. 5-c shows light transmission versus view angle of s-polarized light (solid squares) and p-polarized light (open triangles) of a glass slide coated on one side with an anti-reflective LCP layer according to the present example.

EXAMPLE 8

Optically Patterned "Nano-Grooved" LCP Layer

A 2% solution of a photo-orienting material (JP 265 from CIBA) in cyclopentanone was thinly spin coated at 3000 rpm onto glass plates. The plates were warmed for 10 minutes at 180° C. on a hotplate. The resulting LPP layer had a thickness of about 60 m and was then irradiated, in a first step, via a photo mask (100 μm×100 μm squares) with linearly polarized UV-light for 4 minutes. In this procedure the direction of polarization of light lay in the plane perpendicular to the plates (aligning directional). In a second step, after rotation of the direction of the linear polarization by 45°, the mask was removed and the layer irradiated for 30 seconds (aligning direction $a_2$). This results in a photo-patterned LPP layer with two different aligning directions $a_1$ and $a_2$.

Then, a 3.8 wt % solution of mixture Mix3 (see Example 3)—made in ethyl acetate, homogenized with moderate stirring for 30 min at 50° C., and filtered through a 0.2 μm filter—was thinly spin coated at 1000 rpm onto the photo-patterned LPP layer. The obtained layers were irradiated for 5 minutes under nitrogen at room temperature using isotropic (non-polarized) light from a mercury lamp at an intensity in the ultraviolet of 4.5 mW/cm². After this irradiation, the LCP monomers had become cross-linked. The layers were optically transparent. Finally, the layers were rinsed with a solvent to remove the non cross-linked material. After this procedure, the layers were still transparent. The total thickness of the resulting anti-reflection LCP layer is about 100 nm.

Figure 6:
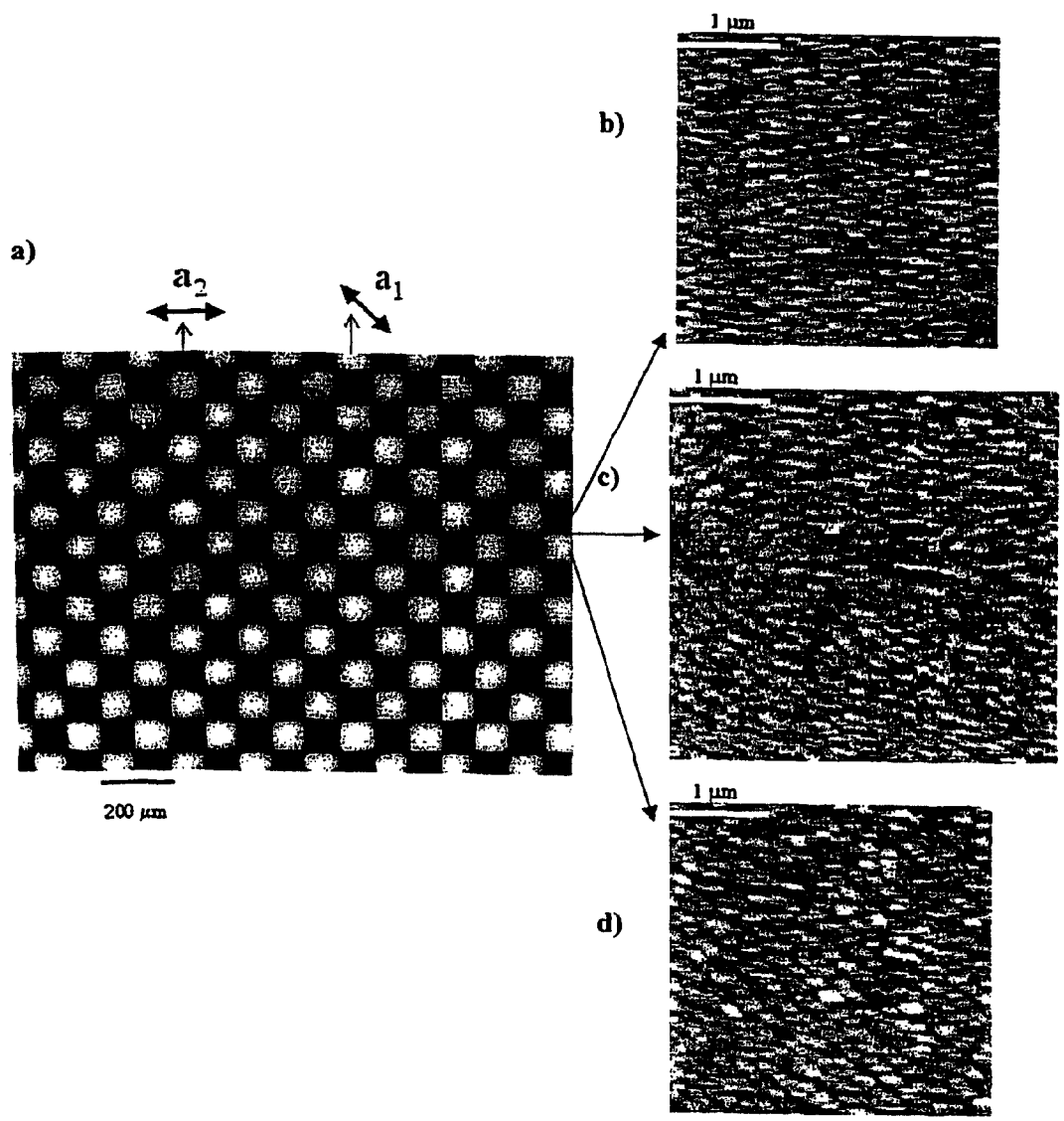

Using a polarization microscope, it was established that the orientation of the optical axis of the LCP layer was parallel to the two aligning directions ($a_1$ and $a_2$) of the patterned LPP layer. FIG. 6 shows an example of the obtained results. Using contact-mode AFM, the layers were found to contain "nano-grooves" along the aligning directions, $a_1$ and $a_2$, in adjacent squares. The grooves have an average period λ of about 150 nm and an average height A of about 70 nm.

EXAMPLE 9

Making an LCP Film with a "Grooved" Topological Structure Leading to an Anisotropic Diffuser A mixture Mix5 was made from:
52.6 wt % of Monomer 1
9.9 wt % of Monomer 2
3.3 wt % of Monomer 3
32.8 wt % of 5CAPO2
0.7 wt % of a photoinitiator (Irgacure (trade mark) 369 by CIBA), and
0.7 wt % of BHT (butyl hydroxy toluene) as an inhibitor.

A 16 wt % solution of mixture (Mix5) was made in a mixture of 9 parts butyl acetate and 1 part ethanol, then homogenized with moderate stirring for 5 min using ultrasonic vibrations (with a Sonifier (trade mark) "W-250" digital by BRANSON Ultrasonics Corporation), and filtered trough a 0.2 μm filter.

The solution was then thinly spin coated at 800 rpm onto an LPP orientation layer (of about 60 nm thickness) prepared using the photo-orienting material 3P 265. The plates were warmed for 1 minute at 50° C. on a botplate. The layers were then irradiated for 2 minutes under nitrogen at room temperature by isotropic (non-polarized) light from a mercury lamp at an intensity in the ultraviolet of 4.5 mW/cm² to cross-link the LCP monomers. The layers were optically transparent. Finally, the layers were rinsed with ethanol to remove the non cross-linked material. The total thickness of the resulting LCP layer is about 400 nm. Using contact-mode AFM it was found that grooves (or channels) are formed, which are elongated in the direction of the underlying LPP orientation layer. The grooves had an average period (λ) of about 900 nm and an average height (A) of about 70 nm. The layers were optically diffusing at certain viewing angles with respect to the grooves direction.

The transmission (reflectivity) of such coatings was evaluated at optical wavelength of 550 nm, using a Variable Angle Spectroscopic Ellipsometer (V. A. S. E. from J. A. Woolam Co.) at various viewing angles with respect to the grooves direction. The transmission of the coatings reaches values of about 90% for the crossed transmission (i.e. transmission measured with the orientation direction of the LCP layer perpendicular to the direction of polarized light), and about 50% for the parallel transmission (i.e. transmission measured with the orientation direction of the LCP layer parallel to the direction of polarized light). This imparts a strong directional dependence of the reflecting appearance to the layer. The extinction ratio of such layers can reach values of about 2.

EXAMPLE 10

Making an Optically Patterned Anisotropic Diffuser

A 2% solution of the photo-orienting material JP 265 in cyclopentanon was thinly spin coated at 3000 rpm onto glass plates. The plates were warmed for 10 minutes at 180° C. on a hotplate. The resulting layer had a thickness of about 60 nm. It was then irradiated, in a first step, via a photo mask (see FIG. 7-b, the smallest square corresponds to 2000 μm×2000 μm) with linearly polarized UV-light for 4 minutes. In this procedure the direction of polarization of light lay in the plane perpendicular to the plates (aligning directional, see FIG. 7-a). In a second step, after rotation of the direction of linear polarization by 45°, the mask was removed and the layer irradiated for 30 seconds (aligning direction $a_2$). This results in a photo-patterned LPP layer with two different aligning direction $a_1$ and $a_2$.

Then, the solution of mixture Mix5 (see Example 9) was thinly spin coated at 800 rpm onto the photo-patterned LPP layer. The obtained layers were irradiated for 2 minutes under nitrogen at room temperature using isotropic (non-polarized) light from a mercury lamp at an intensity in the ultraviolet of 4.5 mW/cm². After this irradiation, the LCP monomers had become cross-linked. The layers were optically transparent. Finally, the layers were rinsed with ethanol to remove the non cross-linked material. The total thickness of the resulting reflection LCP layer is about 400 nm. Using contact-mode AFM, the layers were found to contain "grooves" with two different directions in the adjacent pixels as imposed by the orientation layer. The grooves have an average period of about 900 nm and an average height of about 70 nm. Optical investigations of the layers showed that the adjacent pixels have two different orientation directions shifted with an angle of 45° as imposed by the double UV-illumination. It also showed that adjacent pixels have different reflection (or transmission), which also depend on viewing angle with respect to the grooves direction (see FIG. 7).

EXAMPLE 11

Making an Optically Patterned Diffusing Reflector

Figure 8:
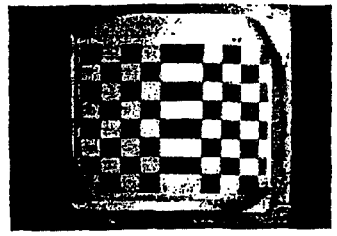
Figure 8:
Figure 8:
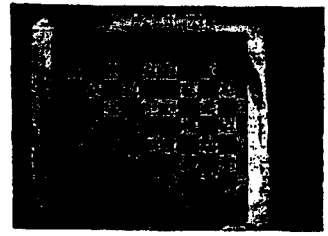
Figure 8:
Figure 8:
Figure 8:
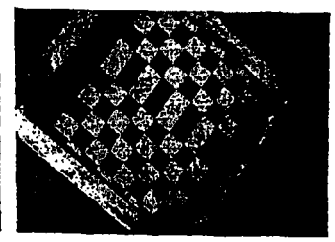
Figure 8:
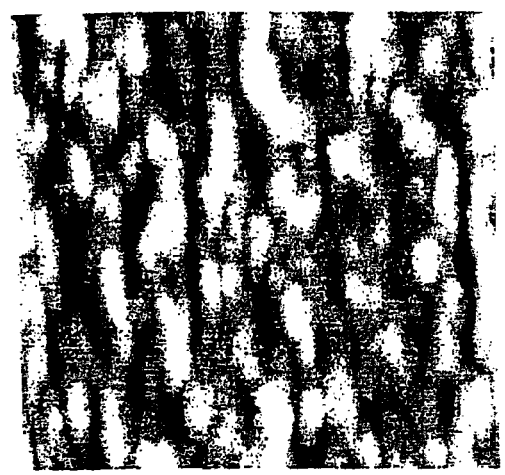
Figure 8:

A thin aluminium (Al) layer (of about 80 nm thickness) was evaporated onto an optically patterned "grooved" LCP layer prepared according to Example 10. After evaporation, AFM investigations showed that the evaporated aluminium layer has covered the LCP layer completely, and that the grooves still existed (see FIG. 8-b). The result was an LCP/aluminium modulated coating with grooves of an average period (λ) of about 1.0 μm and an average height of about 70 nm. The grooves in adjacent pixels have two different orientation directions shifted with an angle of 45° as imposed by the double UV-illumination. Optical investigations of the coating showed that the adjacent pixels reflect light in a different way depending on illumination and viewing angles. Typical examples are shown in FIG. 8-a.

What is claimed is:
1. A method of creating a polymer film or coating on a single substrate, wherein the polymer film or coating has oriented grooves on its free surface opposite to the substrate, comprising mixing at least two materials, of which at least one material is not cross-linkable and at least one other material is cross-linkable, wherein the cross-linkable material is liquid crystalline, applying a layer of the mixture to a single substrate comprising an orientation layer by using a coating method, orienting the mixture to form oriented grooves on the surface of the mixture layer opposite to the substrate, cross-linking said cross-linkable material while the cross-linkable material is maintained in an oriented state by the underlying orientation layer, and removing the non-cross-linkable material.

2. A method according to claim 1, wherein the cross-linking is effected by exposing the cross-linkable material to light, which is optionally polarized.

3. A method according to claim 2, wherein the cross-linking is effected by exposing the cross-linkable material to light which is polarized.

4. A method according to claim 2, wherein the cross-linking is effected by exposing the cross-linkable material to light which is not polarized.

5. A method according to claim 1, wherein the non-cross-linkable material is liquid crystalline.

6. A method according to claim 1, wherein the underlying orientation layer is a photo-oriented layer.

7. A method according to claim 1, wherein the cross-linkable material is present in $1/10$ to 30 parts by weight per part of non-cross-linkable material.

8. A method according to claim 1, wherein the cross-linkable material is present in $1/4$ to 4 parts by weight per part of non-cross-linkable material.

9. A method according to claim 1, wherein the removal of the non-cross-linkable material is by using a solvent inactive towards the cross-linkable material.

10. A method according to claim 1, wherein the single substrate is a single glass plate.

11. A method according to claim 1, wherein the single substrate is plastic.

12. A method according to claim 1, wherein the single substrate is paper.

13. A method according to claim 1, wherein the single substrate is metal.

14. A method according to claim 1, wherein the single substrate is a semiconductor.

15. A method according to claim 1, wherein the coating method is spin coating.

* * * * *